Jan. 24, 1967   E. ZURMÜHLEN   3,300,110
CARRIER FOR CYCLES, FOR EXAMPLE BICYCLES
Filed July 21, 1965
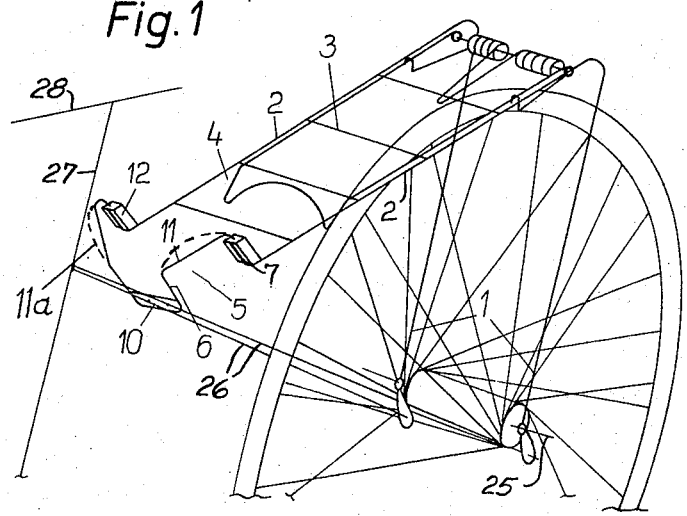
Fig. 1
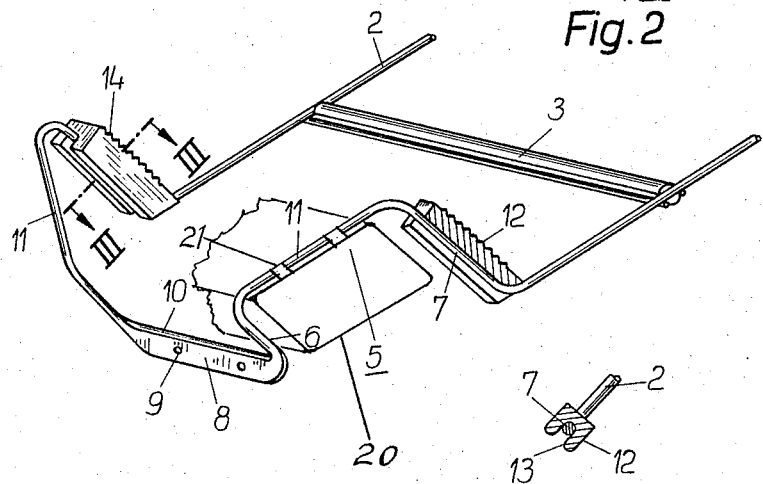
Fig. 2
Fig. 3
Inventor:
Emil Zurmühlen United States Patent Office 3,300,110
Patented Jan. 24, 1967

3,300,110
CARRIER FOR CYCLES, FOR EXAMPLE BICYCLES
Emil Zurmuhlen, Brackwede, Germany, assignor to ESGE Marby G.m.b.H. & Co., Brake, near Bielefeld, Germany, a limited-liability company of Germany
Filed July 21, 1965, Ser. No. 473,673
Claims priority, application Germany, July 23, 1964, E 20,272
6 Claims. (Cl. 224—39)

The present invention relates to article carriers for cycles, and particularly to an article carrier for bicycles, motorcycles and the like formed to provide a counter piece for the articles to be carried and to provide a clear space for rim, or caliper brakes.

Article carriers for bicycles, motorcycles and the like usually consist of an essentially horizontal article carrier surface, ordinarily made of rod like material. A frame is formed of two parallel bars, supplied with cross pieces. A spring biased bail is provided at one end in order to hold the articles to be carried. In order to provide for a secure attachment of the articles to be carried, it is normal to provide, in addition to the article carrier surface, a counter piece against which the article to be carried can bear, as it is held down by the spring pressed bail. Such a counter piece may consist of a separate bail, soldered or welded to one of the cross pieces. It has also been proposed to provide upright counter pieces to be secured on the frame of the bicycle, or motorcycle, in order to form a stop, or counter for articles to be carried. Both these known forms require additional operating steps in the manufacture of the carrier, or additional attachment pieces for the vehicle itself.

It is an object of the present invention to provide a carrier for cycles, such as bicycles and motorcycles, which is simple to manufacture and permits installation of caliper, or rim brakes without requiring any special adapters.

Briefly, in accordance with the present invention, the article carrier for cycles, for example bicycles and motorcycles, is formed of a frame which has a pair of parallel frame bars arranged to be mounted on top of the rear fender of the rear wheel, respectively. The outer ends of the two frame bars are supported, as is customary, by support rods or braces secured to the axle of the wheel over which the carrier is to be mounted. The other ends of the frame bars, in accordance with the invention, are formed with a projecting, inverted U-shaped portion having an extended top at the bend of the U. The upstanding leg of the U forms an article counter, or stop, against which articles to be carried can bear. The remote end of the article carrier is provided, as is customary, with a spring clip, or bail, to hold the articles down against the frame bars.

The space beneath the U provides clearance for the installation of caliper brakes. The U shaped portion may be round at the top, or the angles between the flat portion of the U may be sharp. The space below the U can be used to place a tool box, or other carrier for minor articles.

The structure, organization and operation of the invention will now be described more specifically in the following detailed description with reference to the accompanying drawings, in which:

FIGURE 1 shows a carrier, partly schematic, partly perspective and parts of the rear wheel and frame of a bicycle;

FIGURE 2 shows a portion of the carrier of FIGURE 1 to a larger scale; and

FIGURE 3 is a sectional view along line III—III of FIGURE 2.

Referring now to the drawings: The carrier consists of tubing, or solid rod material, having braces 1 secured to the rear axle 25, of the bicycle. Parallel frame bars 2, interconnected by cross bars or rods 3 form an article support area, or region, and are designed for substantially horizontal position on the bicycle. A spring loaded holding bail, secured to one of the cross braces 3 is provided, as known, in order to hold articles, not shown in the drawings, on the parallel frame bars.

The article support area is defined at the other end of the support bars by a projecting U-shaped region, into which the support bars 2 are formed. The upstanding legs, 7, of the U, generally indicated at 5, form a counter stop, or a bracing area against which the articles to be carried on the carrier can be placed. The other legs of the U, 6, are bent downwardly again and terminate in an attachment region 10, for example a flattened crosspiece 8, and formed with holes 9 to secure the carrier to the rear frame part 26 of the bicycle. Rear frame part 26 is secured to the saddle support 27, as known. The saddle, or seat, is schematically indicated at 28. Legs 6 and attachment portion 10 are preferably angled in such a way that the flattened portion 8 is parallel to the portion of the frame 26 of the bicycle to which it is to be attached. Likewise, legs 7 are preferably parallel to legs 6. The top portion of the U, 11, may be flat as shown in FIGURE 2, or may be rounded as shown in dashed lines in FIGURE 1, and as at 11A. The space beneath the U, that is region 5, permits ready installation of rim, or caliper brakes, and provides sufficient clearance for the brake mechanism from the carrier. The length of the top portion 11 is about equal to the lengths of the legs 6 and 7 of the U. Legs 7, forming a counter stop for articles, prevent interference of articles to be carried with the braking mechanism. The legs 7 are preferably protected by a clip 12 of rubber, or other resilient material, serrated as at 14, and provided with a groove 13 so that clip 12 can be snapped over legs 7. A small pocket, or carrier 20, secured for example by straps 21 and shown in schematic outline form only, may be placed in the space provided by the U shaped frame bars without interference with the brake mechanism.

The carrier according to the present invention provides a simple means to form a counter stop for articles to be carried, and prevent their interference with brake operation, or inadvertent loss of the articles. No special operation to form this counterstop is necessary, and a 1-piece frame formed of bent bars 2 can be readily constructed. The frame can be bent and welded together at a central portion, for example in the region of the attachment area 8, or at the end where the spring bail 4 is attached. If desired, cross braces similar to cross braces 3 may be placed in the region 11 of the U shaped portion of the frame bars 2, or at other locations, for example just above or below, or even through rubber clips 12.

I claim:
1. An article carrier for cycles comprising a pair of parallel bars adapted to extend lengthwise over the rear wheel of the cycle; stop means at the rear of said bars; a pair of attachment braces, one brace each being connected to a bar at adjacent first ends of said bars and extending downwardly for connection at its other end to the cycle; said bars having a flat article support region and a projecting article counter stop region at the other end of said bars; said article counter stop region comprising an inverted U-shaped bend formed in each said bar, the legs of the U being spaced from each other and parallel to each other and connected by an extended top portion having a length approximately the length of the leg to form a spacer for a brake mechanism therebeneath; a cross piece; the leg in each U-shaped bend remote from said article support region being integrally joined together at their lower ends by said cross piece; and means for connecting said cross piece to the cycle frame adjacent the cycle seat, the article support region being spaced from said attachment region by said extended top portion.

2. A carrier as claimed in claim 1 wherein said inverted U-shaped bend is formed with a flat top portion.

3. A carrier as claimed in claim 1 wherein said inverted U-shaped bend is formed with a bowed top portion.

4. A carrier as claimed in claim 1, wherein the legs in each U-shaped bend are angled with respect to the article support region to such an extent as to be substantially parallel to the rear wheel frame portions of the cycle.

5. Article carrier as claimed in claim 1 including bumpers of elastic material resiliently clamped on the legs of the U-shaped bends forming the article support region.

6. Carrier as claimed in claim 1 including an article container secured to said frame bars in the region of the bend of said inverted U and arranged in the space between the legs of the U.

References Cited by the Examiner

UNITED STATES PATENTS

| | | | |
|---|---|---|---|
| 1,508,107 | 9/1924 | Lillesoe | 280—202 |
| 2,589,497 | 3/1952 | Jette | 224—35 |
| 2,700,493 | 1/1955 | Meier. | |
| 3,080,080 | 3/1963 | Miller | 214—750 |

FOREIGN PATENTS

| | | |
|---|---|---|
| 66,174 | 12/1947 | Denmark. |
| 556,992 | 4/1923 | France. |
| 583,841 | 10/1958 | Italy. |

GERALD M. FORLENZA, *Primary Examiner.*

F. E. WERNER, *Assistant Examiner.*